Patented July 13, 1943

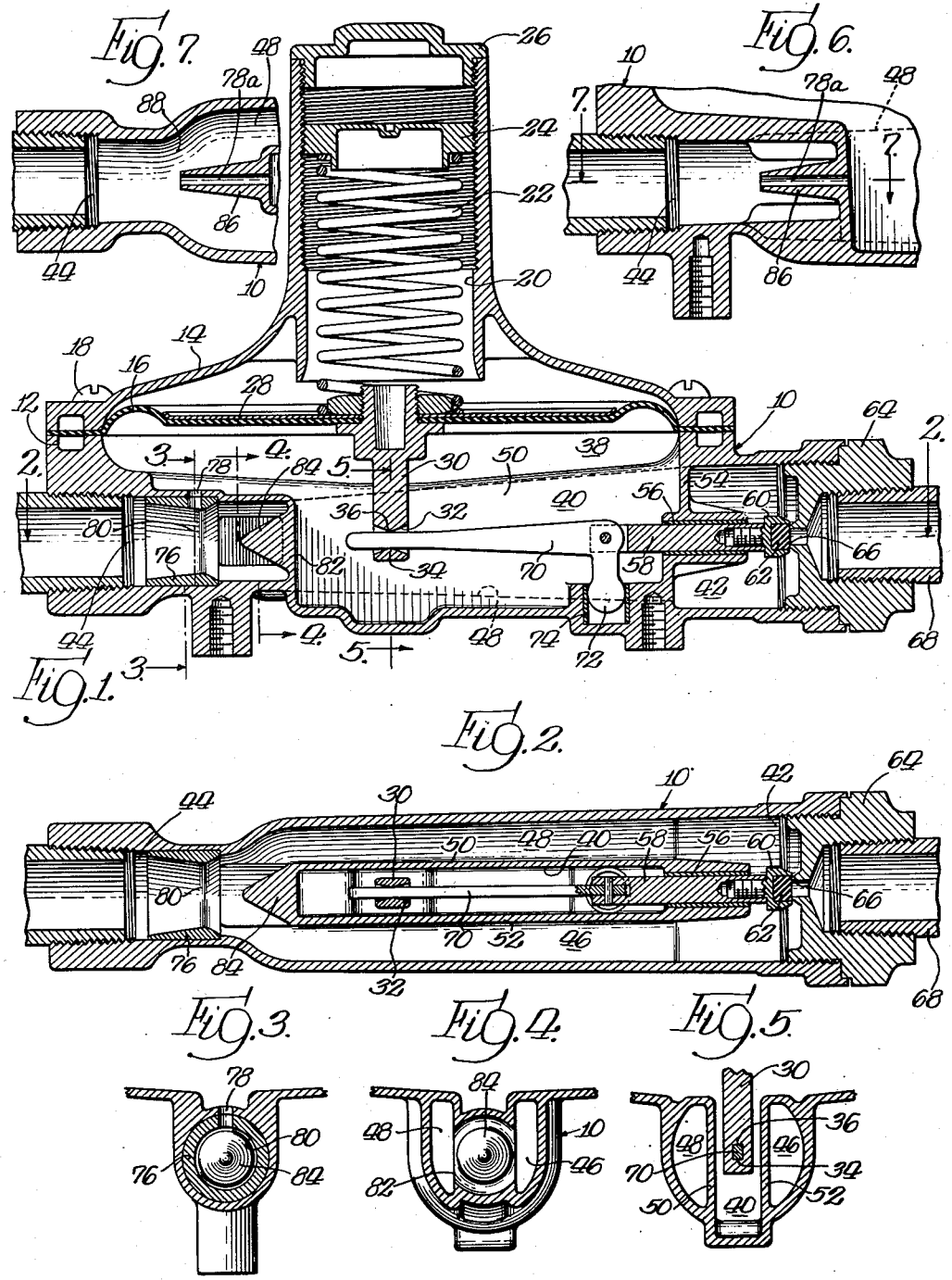

2,323,888

UNITED STATES PATENT OFFICE 2,323,888

PRESSURE REGULATOR

Harold B. Wright, Marshalltown, Iowa, assignor to Fisher Governor Company, Marshalltown, Iowa, a corporation of Iowa Application June 16, 1941, Serial No. 398,313

4 Claims. (Cl. 50—26)

My invention relates to an improvement in pressure regulators or reducing valves.

In conventional valves of this type in which the diaphragm is directly exposed to the moving current of fluid as it passes through the body of the device, there is oftentimes a serious tendency to chatter or buzz, particularly on heavy loads. This is probably due in part to the fact that flow through the control orifice is more or less intermittent or pulsating in character, and the pulsation is transmitted to the diaphragm, which is fully exposed to the pressure and velocity effects propagated through the moving fluid medium.

It is an object of my invention, therefore, to provide a compact, simple structure for a regulator in which the flowing gas or other fluid is isolated from the diaphragm, except for a connection through a passage of such limited cross-section that no substantial flow takes place across the diaphragm itself, and chattering is eliminated.

It is a further object to protect the diaphragm in this way, in a structure which requires no more space and involves no more complex pipe connections than the ordinary simple forms of regulators.

Preferably it is an object to obtain the isolated diaphragm chamber in a structure where the diaphragm is mounted in the main body of the regulator, in order to have the simplicity in assembly and the economy of space requirement previously referred to.

My construction makes possible the attainment of a more specific object, i. e., the provision of a regulator which will maintain satisfactory delivery pressure even under reduced supply pressure, with special reference to heavy demand operating conditions.

This object I may explain in somewhat further detail. The last decade has seen a great increase in the use of liquified petroleum gases, particularly in remote locations where piped gas is not available. The gases are liquified by being compressed in the conventional cylinders at pressures considerably above atmospheric. Such cylinders are connected through a pressure reducing valve to the gas consuming equipment. In extremely cold weather, the liquid in the cylinder may become so cold that it does not evaporate readily, and hence the pressure of available gas in the cylinder falls off if the demand for gas is very great.

Even in warmer weather, a heavy demand for gas, and the resultant refrigeration of the tank due to rapid evaporation of the liquid, may reduce the temperature to the point where the tank pressure drops off. Under ordinary conditions of temperature and demand, of course, the cylinder pressure becomes low as the supply of gas is exhausted.

It is customary to provide a pressure regulator or reducing valve to reduce the tank pressure to a value suitable for use in ordinary domestic gas consuming devices. Regulators of the types ordinarily used in the bottled gas industry have had the disadvantage that their outlet pressure tended to fall off sharply when the rate of flow was increased, particularly when the tank pressure was low, either because of cold weather, heavy demand refrigeration effect, or because the gas in the tank was nearly exhausted.

It is an object of my invention to provide a pressure regulator or reducing valve which will have a much more uniform delivery pressure characteristic, throughout a wide range of rates of flow, and throughout the full range of tank or cylinder pressures.

It is a further object of my invention to provide a regulator of simple and compact construction, capable of economical manufacture, and easily serviced in the field.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1 is a median vertical sectional view through a pressure regulator embodying my invention.

Figure 2 is a horizontal sectional view taken on the line 2—2 of Figure 1.

Figure 3 is a fragmentary vertical sectional view taken on the line 3—3 of Figure 1.

Figure 4 is a fragmentary vertical sectional view taken on the line 4—4 of Figure 1.

Figure 5 is a fragmentary vertical sectional view taken on the line 5—5 of Figure 1.

Figure 6 is a fragmentary view similar to the left portion of Figure 1, and showing a modified form of the invention.

Figure 7 is a fragmentary view taken on the line 7—7 of Figure 6. The view is similar to the left portion of Figure 2, but shows the modified form of Figure 6.

In the drawing I have used the reference numeral 10 to indicate generally the main body member which in the form shown is preferably a die casting, although it may be made in any other suitable manner. On the top side of the body member 10 is an annular rim 12 and coacting with this rim is a bonnet 14. A flexible diaphragm 16 is interposed between the bonnet 14 and the rim 12 and is clamped in place by screws 18 which pass through the edge of the bonnet into the rim 12. The bonnet has a central bore 20, containing the coil spring 22. An adjusting plug 24 is threaded into the bore 20 and is used to vary the compression of the spring. A cap 26 closes the upper end of the bore. A plate 28 of metal or other suitable stiff material lies adjacent the upper central portion of the diaphragm 16, and the lower end of the spring bears against this plate.

Instead of the spring, a weight, lever and weight, or other equivalent means of biasing the diaphragm may be used.

Fastened centrally in the plate 28 and the diaphragm 16 is a stem 30 which at its lower end has an opening 32, the edges of which are chamfered toward the inside, to give V-shaped edges 34 and 36.

The main body member 10 is formed with a shallow concave diaphragm chamber 38. Extending along one diameter of this chamber and connecting with it is a deep, relatively narrow slot 40, which is perhaps best seen in the cross sectional view of Figure 5. The stem 30 projects down into this slot.

Beneath the diaphragm chamber 38, the main body member 10 is formed to provide a passageway having an inlet end 42 and an outlet end 44. In the intermediate portions of the main body member 10 the passage is divided into two branches 46 and 48 by the side walls 50 and 52 defining the slot 40.

A wall 54 closes the end of the slot 40 adjacent the inlet portion 42 of the passage. A bore through this wall is provided with a sleeve 56 in which a stem 58 is slidably mounted. This stem carried a valve member 60 which carries a composition disk 62 of material resistant to the gases to be controlled.

The inlet end 42 of the passageway is closed by an inlet adaptor 64 which provides a valve seat 66 with which the valve disk 62 co-acts. The inlet pipe 68 from the pressure cylinder or tank is threadedly connected to the inlet adaptor 64.

A bell crank 70 is pivoted to the stem 58. A long arm of the crank extends through the opening 32 of the stem 30, and a short arm is provided with a circularly rounded end 72 which fits smoothly within a sleeve 74 fixed in a bore in the bottom of the slot 40. As the stem 30 moves up and down in response to the balance of pressures on opposite sides of the diaphragm 16, the bell crank 70 will pivot in the sleeve 74, and will cause longitudinal movement of the valve stem 58. The pressure existing in the valve chamber 38 therefore controls the opening and closing of the valve 60 against the seat 66.

In the outlet portion 44 of the gas passage, I preferably provide, as shown in Figures 1–5, a sleeve 76 having an inner bore formed as a venturi. In other words, the diameter of the bore at the ends of the sleeve is relatively large, while there is an intermediate portion 80 of restricted diameter, with a smooth transition between the portions of various diameters. A passageway 78 extends from the chamber 38 to the restricted portion 80 of the venturi.

The result of the connection to the diaphragm chamber in this manner is that when gas is flowing a difference of pressure occurs between the chamber 38 and the outlet of the regulator, this difference increasing with increasing rates of flow through the gas passage and hence through the venturi 76. The pressure in the chamber 38 will be lower than the pressure at the outlet of the regulator. This means that during periods of high demand, the control valve 60 will be opened further than in periods of low demand, so that there will be less resistance to flow of gas at the valve orifice. Therefore adequate flow can take place even if the tank or cylinder pressure is low for any of the reasons previously mentioned. A very satisfactory uniformity in outlet pressure is thus achieved, as indicated by the following tables which show the performance characteristics of typical commercial regulators embodying my invention.

*Propane*

| Flow | | Cylinder pressure, lbs. per sq. in. | | | |
|---|---|---|---|---|---|
| Pounds per hr. | Cu. ft. per hr. | 10 | 50 | 100 | 150 |
| | | Regulator delivery pressure inches of water column | | | |
| 0 | 0 | 10.35 | 11.00 | 11.40 | 12.00 |
| 2.92 | 25 | 10.20 | 10.70 | 11.00 | 11.50 |
| 8.75 | 75 | 10.00 | 10.55 | 10.90 | 11.35 |
| 17.50 | 150 | 9.65 | 10.50 | 10.90 | 11.30 |
| 35.00 | 300 | 9.05 | 10.30 | 10.90 | 11.30 |

*Butane*

| Flow | | Tank pressure, lbs. per sq. in. | | | |
|---|---|---|---|---|---|
| Pounds per hr. | Cu. ft. per hr. | 5 | 10 | 25 | 50 |
| | | Regulator delivery pressure inches of water column | | | |
| 0 | 0 | 10.90 | 11.00 | 11.20 | 11.60 |
| 3.83 | 25 | 10.76 | 10.90 | 11.00 | 11.32 |
| 11.50 | 75 | 10.43 | 10.75 | 10.90 | 11.15 |
| 22.9 | 150 | 9.95 | 10.50 | 10.75 | 11.10 |
| 45.9 | 300 | 8.90 | 10.00 | 10.55 | 11.10 |

It will be understood that my invention applies to any modification of the structure shown in Figures 1–5 whereby the diaphragm chamber is connected to the main flow channel in such a way that the pressure in the diaphragm chamber falls off, with respect to the delivery pressure of the regulator, with increasing rates of flow. In Figures 6 and 7, for example, I have shown a modified form in which the principle is embodied.

In the form of Figures 1–5, at the point where the branch passages 46 and 48 rejoin, near the venturi 76, the rear wall 82 bounding the slot 40 is provided with a conical projecting portion 84 which aids streamline movement of the gases and reduces the eddy currents which would otherwise increase the pressure drop within the regulator itself.

In the modification of Figures 6 and 7, the sleeve 76 is omitted, and the rear wall 82 bounding the slot 40 is formed with a conical nozzle 86, projecting out into the region 88 where the flow channel is contracted. A passage 78a extends through the nozzle, and thus makes the pressure existing at the region 88 in the flow channel effective upon the diaphragm. To a certain extent, also, the nozzle is this construction doubtless acts as a reversed Pitot tube, so that the pressure in the passageway 78a is lower than the delivery pressure of the regulator when gas is flowing.

Certain other features of my construction should have further mention. The forming of an effective pivot by insertion of the circular shaped end 72 of the bell crank in the sleeve 74 makes for simplicity, economy, and operating reliability. There is no necessity for inserting a pivot pin in a difficult location during manufacture or servicing.

If the valve disk 62 becomes worn, it is necessary only to remove the adaptor 64 in order to obtain access to the valve member 60, which is preferably made with a hexagonal head so that a socket wrench can be applied to it for easy removal and replacement. If necessary for cleaning, inspection or other servicing operation, the entire regulator can be dismantled by taking out the valve member 60 as just described, removing the bonnet and diaphragm and slipping the stem 30 off the end of the bell crank. Thereupon the long arm of the bell crank can be raised out of the slot 40, until the short end moves out of the sleeve 74, and the bell crank is free except for its attachment to the stem 58. The latter can be slipped out of the sleeve 56.

A construction of the main body with the working space for the diaphragm stem and bell crank lever extending into the gas passage gives a straight-through feed connection of a desirable type, but in a very compact arrangement. This means a saving in materials and manufacture, as well as economy and convenience in space requirement for installation.

It will be seen, therefore, that I have provided a neat structure in which the control diaphragm is made sensitive to the fluid pressure existing in a portion of the flow channel, but in which the diaphragm itself is protected from the disturbing influence of gas flowing across it, and from transient pressure pulses. This is true because there is only one small passage into the diaphragm chamber, which transmits pressure to it, but does not set up any flow of gas through it. The regulator is therefore exceedingly stable and is free from chattering or buzzing.

I have further provided a structure in which the diaphragm chamber is connected to the flow channel by means such that the diaphragm pressure is lower than the regulator delivery pressure when gas is flowing, so that the valve is caused to open wider under heavy demand conditions, and more uniform delivery pressure is obtained.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. In a pressure reducing device, a body member, a fluid passage through said body member, a valve in said passage, a pressure operated diaphragm, a diaphragm chamber having one side thereof closed by said diaphragm, a walled cavity opening into said chamber, the walls of said cavity extending into and bifurcating said passage, actuating means for said valve slidably extending through a wall of said cavity, a cylindrical recess in said cavity, a bell crank having an enlarged end formed with a circular outline of substantially the same diameter as said recess, said enlarged end being received in said recess, the opposite end of said bell crank being connected to said diaphragm and the intermediate portion of said bell crank being pivoted to said actuating means, and a fluid conducting connection from said chamber to a portion of said passage of relatively restricted cross-sectional area.

2. In means for controlling the flow of a fluid, a body member having a shallow circular cavity therein, a bonnet constituting a cover for said cavity, a flexible diaphragm clamped between said bonnet and said body member, a spring in said bonnet bearing upon said diaphragm, the position of said diaphragm being responsive to the pressure of fluid in said cavity, a conduit for fluid formed in said body and extending transversely with relation to said cavity, a venturi in said conduit, a passage from said venturi to said cavity, a slot formed in the bottom of said cavity, projecting into said conduit but walled off therefrom, a stem on said diaphragm projecting into said slot, a valve orifice in said conduit in the inlet portion thereof, a valve member slidably extending through the wall of said slot and coacting with said orifice, and a crank element operatively connected to said valve member and slidably engaging said stem.

3. In a fluid flow control device, a body member, a fluid passage through said body member, a valve in said passage, a pressure operated diaphragm, a diaphragm chamber in said body, having one side thereof closed by said diaphragm, a walled cavity opening into said chamber, the walls of said cavity extending into and bifurcating said passage, actuating means for said valve extending through a wall of said cavity, an operative connection between said diaphragm and said actuating means, and pressure transmitting means extending from said fluid passage to said diaphragm chamber.

4. Pressure regulating means including a body member, a fluid passage through said member, a diaphragm chamber formed in said body member, having its walls projecting into and bifurcating said passage, a pressure responsive diaphragm closing one side of said diaphragm chamber, a valve in said passage controlling the entry of fluid thereinto, actuating means connecting said diaphragm and said valve, and a nozzle projecting into said fluid passage in the direction of flow therein, said nozzle having a bore communicating with said diaphragm chamber.

HAROLD B. WRIGHT.